UNITED STATES PATENT OFFICE.

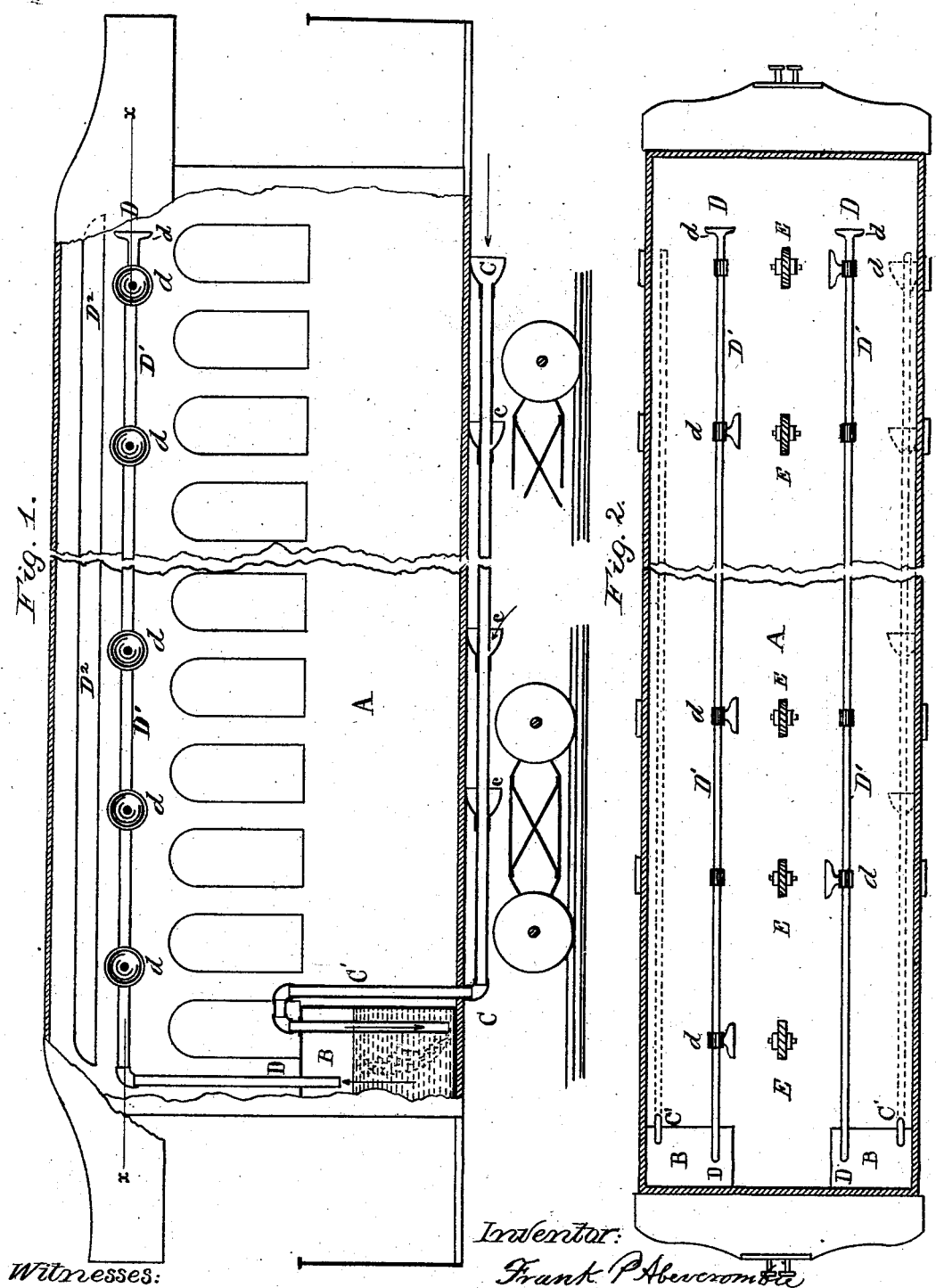

FRANK P. ABERCROMBIE, OF WOODBURY, NEW JERSEY.

CAR-VENTILATOR.

SPECIFICATION forming part of Letters Patent No. 272,371, dated February 13, 1883.

Application filed August 19, 1882. (No model.)

*To all whom it may concern:*

Be it known that I, FRANK P. ABERCROMBIE, a citizen of the United States, residing at Woodbury, in the county of Gloucester and State of New Jersey, have invented certain new and useful Improvements in Car-Ventilators, of which the following is a specification, reference being had therein to the accompanying drawings.

This invention relates to the ventilation of railway-cars; and it consists in forcing the exterior air through inlet-pipes into tanks containing liquid solutions, and from thence into the interior of the car through outlets upon distributing-wheels, whereby the air, after being purified, is dispersed regularly through the car and afterward passes out through the ventilators, all of which will be hereinafter more particularly described, and set forth in the claims.

In the drawings forming a part of this specification, Figure 1 is a vertical longitudinal section of a car with the devices attached. Fig. 2 is a horizontal section on $x\ x$ of Fig. 1.

A represents the frame of a passenger-car, of the usual form. At the end are air-tight tanks B B, in which is a quantity of water, cooled by ice or in any other manner, and in which also may be dissolved certain deodorizing substances and pleasant flavoring-essences to take from the air passing through the liquid all noxious principles and to render the air pleasant to the smell.

C C are inlet-pipes placed beneath the floor of the car, having relay-funnels $c\ c\ c$, so arranged as to gather the air by the rapid motion of the car and force the air through pipes C C upwardly, through C' C' into the water, from above, in tanks B B, where pipes C' C' open near the bottom of the tank.

D D are pipes entering tanks B B, but not reaching to the surface of the liquid. These pipes D D connect with longitudinal pipes D' in the roof of the car, having along them discharging-funnels $d\ d\ d$ at regular intervals. Immediately opposite to each discharging-funnel $d$ is a distributing-wheel, E, with spirals so arranged as to rapidly rotate by the force of the air from the funnels $d\ d$, and thus distribute the air along the inside of the car, and which air will naturally also find its way through the ventilators $D^2$ in the roof of the car.

This method of ventilation is the reverse of the present system, where the air from the exterior passes into the ventilators along the side of the car and finds its way downward into the car.

The passage of the exterior air through the liquid before it can enter the car causes all of the particles of dust and cinders which may be in it to be deposited in the water, and the pure air accumulating above the surface of the water is forced through the rising pipe D into the distributing horizontal pipes D' D' and out of the funnels $d\ d$ into the car, as above described.

I claim—

1. In combination with a railway-car, a ventilating-pipe, the portion thereof extending outside of the car being provided with a series of relay-funnels, whereby the external air may be forced into the car while in motion, substantially as set forth.

2. The combination of the discharging-pipes and their funnels with the spiral distributing-wheels, substantially as and for the purpose described.

3. The combination of the inlet-pipes and funnels and the air-tight tank for liquids with the discharging pipes and funnels and the distributing-wheels, substantially as and for the purpose described.

In testimony whereof I affix my signature in presence of two witnesses.

FRANK P. ABERCROMBIE.

Witnesses:
J. C. ENTWISLE,
H. J. ENNIS.